Dec. 10, 1935.   W. T. LAUGHLIN   2,023,427
ANIMAL TRAP
Filed Sept. 21, 1934

INVENTOR.
William T. Laughlin
BY Samuel Herrick
ATTORNEY

UNITED STATES PATENT OFFICE 2,023,427

ANIMAL TRAP

William T. Laughlin, Oklahoma City, Okla.

Application September 21, 1934, Serial No. 744,978

4 Claims. (Cl. 43—61)

Figure 1:
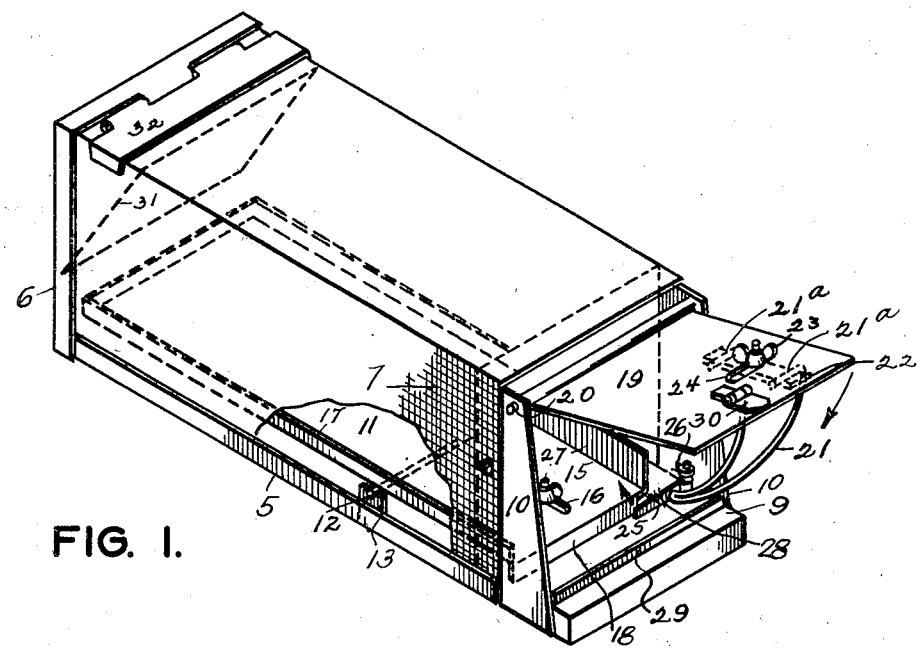
Figure 2:
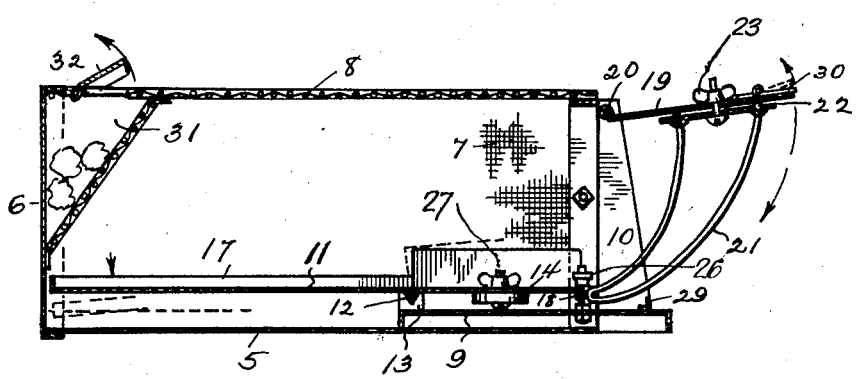

This invention relates to animal traps adapted to capture animals alive, and it has as its object to provide an improved device of this nature constructed in such manner as to be economical of manufacture while, at the same time, exceedingly sensitive in its action and secure after an animal has been trapped therein. In the accompanying drawing, Fig. 1 is a perspective view of a trap constructed in accordance with the invention, and Fig. 2 is a longitudinal sectional view therethrough.

Like numerals designate corresponding parts in both of the figures of the drawing. The trap will be described as though we were looking from the front end, or the end which carries the hinged door. In the particular form of the invention chosen for purposes of illustration, I have provided a true, solid bottom, 5, solid rear end, 6, and wire mesh side and top walls, 7 and 8, a secondary fixed bottom, 9, which, in effect, constitutes a part of the bottom, 5, and projects forwardly therebeyond at the front end of the trap and carries the solid, preferably metallic side walls, 10, which constitute a point of attachment for the wire mesh of the body of the trap and lend the necessary stiffness and rigidity to its wire mesh walls. A false bottom, 11, is provided with trunnions 12, which rest upon the bearings 13, of the bottom, 9. The distance from the fulcrums to the front end of the false bottom is materially less than the distance from the said fulcrums to the rear end of the false bottom. However, the false bottom is counterweighted by means of a weight, 14, adjustable by means of thumb-nut, 15, in slot, 16, of the false bottom. By proper adjustment of the weight, the false bottom may be set so that its front end will be normally depressed and its rear end elevated to cause the parts to lie in the position illustrated in the drawing. The false bottom is provided with an upstanding flange, 17, along its sides and across its rear end, and with a corresponding downturned flange, 18, at its front end, the height of the flange, 18, being such that when it contacts with the bottom, 9, the false bottom will be approximately level. A door, 19, is pivoted at 20 between the walls, 10, and when the trap is set, this door is held in elevated or open position by a curved bracket, 21. This bracket is preferably made of wire, and its bent ends are turned over as indicated at 21a to adapt them to be gripped between door, 19, and a plate 22, under the action of a thumb-nut and screw, 23. The door is transversely slotted at 24, so that the bracket may be adjusted bodily toward or from the center line of the trap.

When the trap is set, the lower end of the bracket, 21, bears upon a tongue, 25, that is pivoted upon a post, 26, and the free end of this tongue rests against the flange, 18, of the false bottom, 11. The flange, 18, is cut away at its right-hand end, and the material of the false bottom is cut and turned upwardly as at 27 to leave sufficient space at 28 between the side of the false bottom and the side wall of the trap to permit the bracket, 21, and tongue, 25, to swing inwardly when the rear end of the false bottom is depressed by an animal. When this happens, the front end of the false bottom is elevated, and the flange, 18, is moved out of the path of the free end of the tongue, 25. This tongue, under the influence of the thrust of bracket 21, occasioned by the weight of door 19, swings inwardly and around against the side wall, 10. This permits the door to drop and when the door drops, its lower edge passes beyond a transverse cleat, 29, a sufficient distance to permit a pivoted latch, 30, to engage behind said cleat. This latch yields in passing the cleat, and then its free end, which projects slightly beyond the edge of the door, drops in behind the cleat, 29, and effectively locks the door and traps the animal in the trap. A bait compartment 31 is formed at the rear end of the trap, said compartment being provided with a hinged closure, 32.

The combination of the great leverage exerted by the animal upon the rear end of the platform, the adjustable weight fastened to the false bottom, and the adjustable bracket, 21, which permits the weight of the door to be imposed upon the tongue, 25, either close to the post, 26, or farther away from said post at will, provides a structure so delicate and sensitive in adjustment that even on a large trap, a small mouse will trip the door and make a positive catch. The animals have no access to the bait.

It is to be understood that the invention is not limited to the particular construction described, but that it includes within its purview whatever changes fairly come within either the terms or the spirit of the appended claims.

Having described my invention, what I claim is:

1. A trap of the character described having a pivoted false bottom, a swingingly mounted tongue bearing against a portion of said bottom, a horizontally pivoted door and a member carried by said door and bearing upon said tongue.

2. A trap of the character described having a pivoted false bottom, a swingingly mounted tongue bearing against a portion of said bottom, a horizontally pivoted door, a member carried by said door and bearing upon said tongue, and means for adjusting said member to cause it to bear upon said tongue at varying points in the length of the latter.

3. The combination with an elongated rectangular receptacle, having a fixed bottom, of a false bottom trunnioned thereon at a point nearer its forward than at its latter end, said false bottom extending substantially from side to side of the receptacle except at one side of its forward end portion where it is spaced further from the side wall of the receptacle than at its other portions, a horizontally pivoted door, a bracket adjustable transversely of said door, and a tongue pivoted for horizontal swinging movement upon a vertical axis that is disposed adjacent to the side of the receptacle, and upon which said bracket bears, and means carried by the forward end of the false bottom and adapted to be engaged by the free end of said tongue.

4. A device of the character described comprising an elongated receptacle which includes a fixed bottom and a false bottom pivotedly mounted with respect to the fixed bottom upon a transverse axis disposed nearer its front end than its rear end, a bait compartment in the rear end of the receptacle, a closure for the bait compartment, said receptacle comprising wire mesh side walls and solid side wall portions projecting forwardly beyond the receptacle and to which the wire mesh portions are secured, a door for closing the front end of the receptacle, said door being pivoted upon a horizontal axis in the solid portions of the side wall members, a latch carried by said door and a bracket carried by the door, and a member carried by the receptacle with which said bracket engages, said member in turn engaging with the forward end of the false bottom.

WILLIAM T. LAUGHLIN.